United States Patent [19]

Winter

[11] Patent Number: 4,716,061
[45] Date of Patent: Dec. 29, 1987

[54] POLYPROPYLENE/POLYESTER NONORIENTED HEAT SEALABLE MOISTURE BARRIER FILM AND BAG

[75] Inventor: John P. Winter, Appleton, Wis.

[73] Assignee: Presto Products, Incorporated, Appleton, Wis.

[21] Appl. No.: 810,110

[22] Filed: Dec. 17, 1985

[51] Int. Cl.⁴ .................. B65B 25/06; B32B 27/08
[52] U.S. Cl. .................... 428/35; 428/347; 428/41; 428/483; 428/218; 428/447; 428/516; 428/330; 428/520; 426/110; 426/107; 264/176.1
[58] Field of Search ............... 428/35, 41, 347, 218, 428/483, 447, 516, 520, 330

[56] References Cited

U.S. PATENT DOCUMENTS

| | | | |
|---|---|---|---|
| 2,265,075 | 12/1941 | Knuetter | 93/35 |
| 2,823,421 | 2/1958 | Scarlett | 18/57 |
| 3,143,277 | 8/1964 | Fleur | 229/57 |
| 3,220,635 | 11/1965 | Kasting et al. | 229/57 |
| 3,223,761 | 12/1965 | Raley | 264/95 |
| 3,277,798 | 10/1966 | Krauss | 93/35 |
| 3,337,914 | 8/1967 | Corbett et al. | 18/13 |
| 3,343,663 | 9/1967 | Seidler | 206/46 |
| 3,467,565 | 9/1969 | Utz | 156/244 |
| 3,476,627 | 11/1969 | Squires | 156/244 |
| 3,555,604 | 1/1971 | Pahlke | 18/14 |
| 3,558,330 | 1/1971 | Widiger | 426/127 |
| 3,559,239 | 2/1971 | Work et al. | 18/12 |
| 3,611,492 | 10/1971 | Scheibling | 18/13 P |
| 3,873,643 | 3/1975 | Wu et al. | 260/878 R |
| 3,882,194 | 5/1975 | Krebaum et al. | 260/878 R |
| 3,922,440 | 11/1975 | Wegwerth et al. | 428/437 |
| 3,925,591 | 12/1975 | Breitenfellner et al. | 428/483 |
| 3,973,045 | 8/1976 | Brandberg et al. | 426/110 |
| 4,105,118 | 8/1978 | Williams, Jr et al. | 206/524.2 |
| 4,119,479 | 10/1978 | Williams, Jr. et al. | 156/272 |

(List continued on next page.)

FOREIGN PATENT DOCUMENTS 9005187 1/1974 Japan .................. 428/483

OTHER PUBLICATIONS

Modern Plastics Encyclopedia, vol. 48, #10A (Oct. 1971) p. 62 et seq.
Modern Packaging Encyclopedia, vol. 44, #7A (Aug. 1971) p. 134 et seq.
Eastman Plastics Technical Report TR-62, dated Oct. 1983.
Eastman Plastics Tentative Data, dated Mar. 22, 1982.
Eastman Plastics Materials Bulletin MB-58D dated Mar. 1978.
DuPont Coextrudable Adhesive Resins dated Oct. 1982.
Plexar (Norchem)-Extrudable Adhesive Resins, dated Dec., 1985.

Primary Examiner—P. C. Ives
Attorney, Agent, or Firm—Willian Brinks Olds Hofer Gilson & Lione Ltd.

[57] ABSTRACT

A nonoriented, heat sealable, coextruded, moisture barrier film is disclosed. This film has a base layer ("A") of polypropylene homopolymer, polypropylene copolymer or combinations thereof, a heat sealant layer ("C") of polyester/copolyester or blends thereof and a tie layer ("B") of modified polyethylene homopolymer, modified polyethylene copolymer, modified polypropylene homopolymer, modified polypropylene copolymer, an unmodified polyethylene copolymer or combinations thereof between the base layer ("A") and the heat sealant layer ("C"). This film has three layers ("ABC") or five layers ("CBABC"). This film exhibits a very broad heat seal range and has a moisture vapor transmission rate of from about 0.20 to about 1.0 g/100in²/24 hr. This film has a wide variety of applications as a packaging film including such demanding uses as the inside of a microwave popcorn bag. This film significantly improves the shelf life of microwave popcorn compared to conventional films used for this product. This film also exhibits excellent heat seal properties to itself as well as a wide variety of diverse substrates.

40 Claims, 5 Drawing Figures

U.S. PATENT DOCUMENTS

| | | | |
|---|---|---|---|
| 4,141,736 | 2/1979 | Canty | 96/87 R |
| 4,178,401 | 12/1979 | Weinberg et al. | 428/35 |
| 4,188,441 | 2/1980 | Cook | 428/216 |
| 4,188,443 | 2/1980 | Mueller | 428/216 |
| 4,207,363 | 6/1980 | Lustig et al. | 428/35 |
| 4,264,662 | 4/1981 | Taylor et al. | 428/40 |
| 4,339,498 | 7/1982 | Weiner | 428/349 |
| 4,375,494 | 3/1983 | Stokes | 428/323 |
| 4,386,124 | 5/1983 | Akao | 428/35 |
| 4,389,438 | 6/1983 | Ohtsuki et al. | 428/35 |
| 4,390,573 | 6/1983 | Bullard et al. | 428/35 |
| 4,399,182 | 8/1983 | Brown et al. | 428/215 |
| 4,403,934 | 9/1983 | Rasmussen et al. | 425/192 R |
| 4,405,547 | 9/1983 | Koch et al. | 264/171 |
| 4,421,580 | 12/1983 | Dembicki et al. | 156/69 |
| 4,424,256 | 1/1984 | Christensen et al. | 428/347 |
| 4,450,180 | 5/1984 | Watkins | 426/107 |
| 4,452,846 | 6/1984 | Akao | 428/220 |
| 4,465,449 | 8/1984 | Hornbeck | 425/131.1 |
| 4,477,532 | 10/1984 | Schmukler et al. | 428/441 |
| 4,483,812 | 11/1984 | Hahn et al. | 264/171 |
| 4,484,883 | 11/1984 | Honda et al. | 425/462 |
| 4,515,840 | 5/1985 | Gatward | 428/35 |
| 4,540,623 | 9/1985 | Im et al. | 428/220 |
| 4,543,292 | 9/1985 | Giles, Jr. et al. | 428/412 |
| 4,571,337 | 2/1986 | Cage et al. | 426/107 |

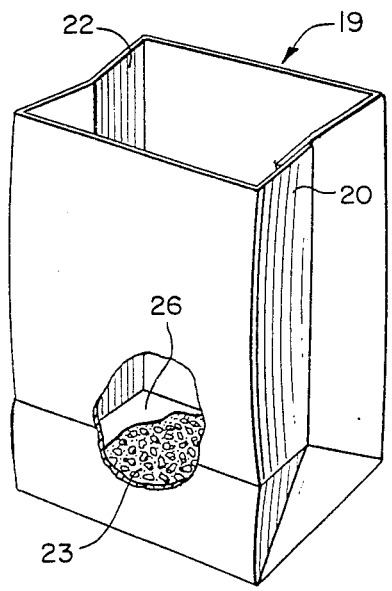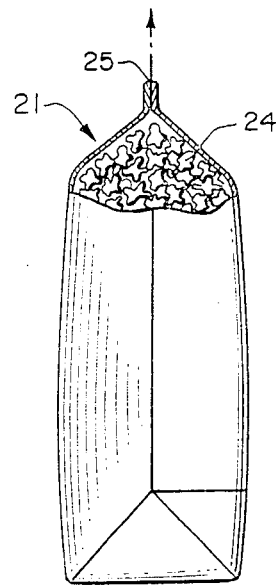
FIG. 3A  FIG. 3B
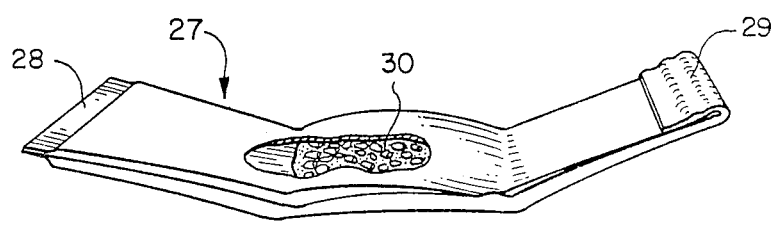
FIG. 4

POLYPROPYLENE/POLYESTER NONORIENTED HEAT SEALABLE MOISTURE BARRIER FILM AND BAG

BACKGROUND AND SUMMARY OF THE INVENTION

The present invention relates to packaging film. Specifically, the present invention relates to multiple layer heat sealable nonoriented packaging films exhibiting excellent moisture barrier properties.

Biaxially oriented polyethylene terephthalate, commonly referred to as "oriented polyester" or "OPET," is a common packaging film with over 200 million lbs. used annually.

An important criteria for any packaging film is its ability to be heat sealed to itself as well as to other substrates. OPET films are not heat sealable. In recent years, however, heat sealable OPET has become commercially available incorporating amorphous homopolymers or copolymers of PET as heat sealants applied either as a coating or coextrusion. OL Mylar is an example of a heat sealable OPET film having the heat sealants applied as a coating. OL Mylar is a registered trademark of E. I. DuPont de Nemours and Company. Melinex 850 is an example of a heat sealable OPET film having heat sealants applied as a coextrusion. Melinex is a registered trademark of Imperial Chemical Industries, Ltd.

Recently, heat sealable OPET films have been used as the inside layer of a paper-film laminated bag for cooking popcorn and other foodstuffs in a microwave oven. Microwave popcorn bags are described in U.S. Pat. Nos. 3,973,045 and 4,450,180. However, the bags of these inventions do not contain an inside film liner, rather they consist of two plys of paper.

Typically, the outer ply is a bleached Kraft paper, while the inner ply is a greaseproof paper such as glassine. These bags are intended for a frozen product in which the bag is filled with the popcorn-cooking oil mixture and then frozen. The product is shipped and stored frozen.

In recent years, "shelf stable" products such as microwave popcorn bags have been introduced. These products do not require any refrigeration. However, the greaseproof paper lined bag used for the frozen product was not adequate for the shelf stable product in that the cooking oil in the unfrozen state would leak through and stain the outer paper liner. This problem was eliminated by changing the inner ply to a plastic film. In particular, heat sealable OPET films are used as the inner ply of the shelf stable bag. An example of this product is Orville Redenbacher's Gourmet Microwave Popping Corn. Orville Redenbacher's and Gourmet are registered trademarks of the Beatrice Companies, Inc.

OPET films are manufactured by an orientation process utilizing tenter frame or "double bubble" techniques. Tentering of plastic films is illustrated in U.S. Pat. No. 2,823,421 and double-bubble orientation is illustrated in U.S. Pat. No. 3,555,604. U.S. Pat. Nos. 4,141,736 and 4,207,363 describe oriented films made using the tenter and double-bubble processes, respectively. The orientation process comprises the steps of (1) extruding a thick web and cooling to a solid state; (2) precise reheating of film to the "orientation" temperature, (3) stretching the film in both longitudinal and transverse directions, and (4) reheating film to relieve internal stresses. Melinex 850 comprises two layers coextruded in step (1) of the orientation process prior to reheating to the "orientation" temperature. An example of a coextruded OPET is disclosed in U.S. Pat. No. 4,375,494. This heat sealable OPET differs from the films of this invention in that the film is oriented.

Alternatively, monolayer OPET can be made heat sealable by laminating it to a heat sealant film. This lamination is done in a separate manufacturing operation. Typically the heat sealant is an olefinic film such as polyethylene. An example of such a lamination is disclosed in U.S. Pat. No. 4,178,401.

An alternative to utilizing heat sealable OPET films for this popcorn application is the use of films from coextrusions of polycarbonate, polyester and/or copolyesters. Such films are described in copending U.S. patent application Ser. No. 759,392. Similar films coextruded without polycarbonate are described in copending U.S. patent application Ser. No. 759,391.

A well known problem with the "shelf stable" microwave popcorn bag is moisture loss from the popcorn as the product ages. The heat sealable OPET films used in this product do not provide a sufficient barrier to the loss of moisture. The moisture content of unpopped popcorn significantly affects the size of the kernel after popping. The higher the moisture content of the unpopped kernel, the larger the size of the popped kernel. In other words, higher moisture content corn will yield "fluffier" popped corn.

The loss of moisture from corn stored in microwave popcorn bags made with heat sealable OPET films results in smaller popped kernels. This translates to a lower volume of popped corn with inferior (compared to fresh corn) texture, i.e., small, hard and dry popped kernels. The loss of volume and degradation of popped corn texture with product age is objectionable to the producer as well as the end user.

One approach used to improve the moisture barrier of the microwave popcorn bag has been to coat the heat sealable OPET with polyvinylidene chloride (PVDC). The use of PVDC coated film has been shown to significantly reduce corn moisture loss hence reduce pop volume loss and popcorn texture degradation due to aging. However, there are two major objections to the use of the PVDC coated films: (1) since the coating requires an additional material and manufacturing step, the finished film is more expensive than non-coated OPET; and (2) the PVDC absorbs microwave energy which, in turn, causes the bag to get very hot. The excessive heat generated can cause charring of the outer paper layer and the degradation of the PVDC which can, in turn, produce noxious odors.

Another approach to modifying heat sealable OPET films to improve their moisture barrier has been to laminate an olefinic film, such as polypropylene, to the OPET film. The olefinic film provides improved moisture barrier but the lamination requires two additional manufacturing steps: (1) production of the olefinic film and (2) lamination of this film to the OPET film.

Coextrusions comprising polypropylene and a heat seal layer are well known. The most common are two layer ("AB") coextrusions comprising a polypropylene base layer ("A") and a polyolefin heat seal layer ("B").

U.S. Pat. No. 4,339,498 describes a coextruded heat sealable film comprising a substrate layer consisting essentially of a homopolymer or copolymer of polypropylene and a heat seal layer consisting of an interpolymer of 2-94 mole % of ethylene, 1-93% of propylene and 5–97% of an alpha-olefin having 4 or more carbon atoms. This film is representative of a polypropylene coextrusion containing a polyolefin heat seal layer.

U.S. Pat. No. 4,424,256 describes a laminated structure consisting of an aluminum foil adhesively joined to a two layer film comprising a base layer consisting of a blend of 20% to 80% linear low density polyethylene and 80% to 20% propylene ethylene copolymer and a heat seal layer consisting of a linear low density polyethylene. This film is also representative of a polypropylene coextrusion containing a polyolefin heat seal layer.

The films of the above-referenced patents differ from the films of the present invention in that they do not utilize a polyester/copolyester as the heat sealant layer. Additionally, the above-referenced films are simple two layer structures wherein a tie layer is not required when coextruding polymers of similar chemistry.

U.S. Pat. No. 4,477,532 describes the use of tie layers in coextruded films. Specifically, a tie layer comprising blends of a nonelastomeric graft copolymer of a nonpolar ethylene homopolymer or copolymer backbone grafted with at least one grafting monomer comprising one or more of polymerizable ethylenically unsaturated carboxylic acids or the anhydrides of such acids blended with an elastomer-free binding resin that is a mixture of one or more linear low density polyethlenes and one or more polypropylenes is disclosed. Composite structures of the tie layer and polar polymers, polypropylene, solid metals, glass, paper, wood or cellophane are disclosed. Three layer structures are disclosed.

U.S. Pat. No. 4,188,443 discloses oriented shrink films. The preferred shrink film has five layers in which the middle layer is a polyester or copolyester, the two layers on either side of the middle layers are ethylene-vinyl acetate copolymers or terpolymers and two outer layers, one on each side of the film, are polypropylene. A three layer film having a middle layer of ethylene-vinyl acetate copolymer or terpolymer, an outer layer of polyester or copolyester and an outer layer of polypropylene. Specifically, the terpolymer PLEXAR 3 is disclosed. PLEXAR is a registered trademark of Norchem, Inc. U.S. Pat. No. 4,188,443 is in the art of oriented shrink films and does not teach the use of such film or any layers thereof in nonoriented heat sealable film applications. Furthermore, U.S. Pat. No. 4,188,443 specifically utilizes polypropylene homopolymer or copolymers as the heat sealant rather than the polyester/copolyester layer.

The film of the present invention is unique in that the polyester/copolyester layer is utilized as the heat sealant layer. Typically, laminations and coextrusions of this type utilize polyethylene homopolymers or copolymers as the heat sealant layer. The present invention discloses surprising results when using polyester/copolyester as the heat sealant. In particular, it has been found that the film of the present invention can be utilized in extremely high temperature demanding applications and in providing differential seal properties. Furthermore, the preferred embodiment discloses a specific copolyester which provides heat seal properties heretofor unobtainable with polyethylenes or other polyesters/copolyesters. Specifically, these properties include a broad heat seal range to a wide variety of substrates and the ability to withstand extremely high temperatures up to 500° F. Despite the fact that the film of the present invention may contain up to 90% w/w of olefins (base layer and tie layer), which melt at 250° F. or less, suprisingly such film can be used in high temperature applications such as microwave popcorn bags where temperatures can exceed 500° F.

The films of the present invention provide an excellent barrier to moisture loss. When used as the inner liner of a microwave popcorn bag, the loss of moisture from the corn is significantly reduced compared to bags lined with heat sealable OPET. As a result, corn stored in bags lined with the films of this invention does not exhibit any significant loss of popped volume or texture with aging.

The nonoriented, heat sealable moisture barrier films of the present invention do not contain any PVDC, do not become excessively hot or degrade when used in microwave cooking applications such as a liner of a popcorn bag for microwave ovens and can be produced on conventional film extrusion equipment. Unlike PVDC coated OPET film or laminations of polyolefin films to OPET, the films of this invention can be made in a single manufacturing step. Furthermore, the film costs about the same or less than the non-PVDC coated OPET films. Therefore, a moisture barrier popcorn bag can be made with films of this invention without an increase in cost over the typical bag made with OPET.

The films of the present invention comprise a base layer ("A") of polypropylene homopolymer, polypropylene copolymer or combinations thereof, a tie layer ("B") of modified polyethylene homopolymer, modified polyethylene copolymer, modified polypropylene homopolymer, modified polypropylene copolymer, unmodified polyethylene copolymer or combinations thereof, and a heat seal surface layer ("C") of polyester, copolyester or blends thereof yielding a three layer film ("ABC") or a five layer film ("CBABC") which are preferred embodiments. The films can be produced by conventional blown or cast coextrusion techniques.

Conventional blown film coextrusion techniques and equipment therefor are known in the art and are commercially available. Also, conventional cast film coextrusion techniques and equipment therefore is known in the art and is commercially available. The following U.S. patents disclose various extrusion techniques and equipment therefor: 4,484,883; 4,483,812; 4,465,449; 4,405,547; 4,403,934; 3,611,492; 3,559,239; 3,476,627; 3,337,914; 3,223,761 and 3,467,565.

Also, two conventional cast coextrusion techniques are known in the art. The first method combines the molten polymers in a combining adaptor prior to entering the slot cast die. The second method does not bring the molten polymers in contact with each other until the polymer melt streams are inside the die. Either method will yield a cast coextruded film with very similar properties.

The heat sealant layer ("C") consists of a polyester or copolyester polymer or blend thereof of compatible polymers. The ("C") layer promotes a heat seal when the film is heat sealed to (1) the ("C") layer of the film, or (2) other films or rigid substrates. The heat seal is accomplished by applying heat and pressure against the film and substrate. An example of a heat seal is a seal found on packages of snack foods or the bottom of a plastic trash bag. The heat seal can be either peelable or fused. Heat seals made at the low end of the film's heat seal range (temperature) are peelable while seals made at the upper end of the range are fused.

Optionally, the films can be made with a ("CBABC") configuration where the base material ("A") is "sandwiched" between two pairs of tie and heat sealant layers. This structure provides a film which is heat sealable on both sides, which is preferred in some packaging applications.

The present invention provides compositions of multiple layer moisture barrier heat sealable films which can be used in high temperature applications such as the microwave popcorn bag.

The present invention demonstrates the following advantages over the films disclosed in the prior art: (1) the films of the present invention contain a high temperature polymer (polyester/copolyester) as the heat sealant allowing the film to be used in high temperature applications, including but not limited to microwave popcorn bags; (2) the films of the present invention exhibit a very broad heat seal range; (3) the films of the present invention heat seal to a wide variety of substrates; and (4) the films of the present invention provide differential seal properties for peelable or fusion seals.

It is the object of the present invention to provide film compositions which can be used in place of OPET films, PVDC coated OPET films or olefin-OPET laminated films in extremely demanding applications such as microwave popcorn bags or the like.

It is another object of the present invention to provide multiple layer heat sealable films manufactured by conventional cast or blown film nonorienting coextrusion techniques which can be utilized as an inside liner of a laminate bag such as a microwave popcorn bag or the like produced by laminating the film as the inside liner to a paper layer and forming the bag from the resulting laminate.

It is still another object of this invention to provide films which can be used to produce microwave popcorn bags with superior moisture barrier properties and to cost relatively the same or less than conventional bags made with heat sealable OPET films.

These and other objects of the present invention will be apparent from the description of the preferred embodiments which follows. Such objects are not intended to limit the scope of the present invention.

BRIEF DESCRIPTION OF THE DRAWINGS

FIGS. 3A and 3B illustrate one type of laminate bag used for microwave popcorn bags and other applications.

FIG. 4 illustrates a second type of laminate bag used for microwave popcorn bags and other applications.

DETAILED DESCRIPTION OF THE PREFERRED EMBODIMENTS

Figure 1:
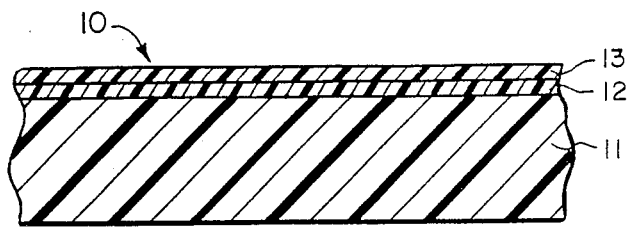
FIG. 1 illustrates a multilayer film of the present invention with a heat sealant layer on one side, ("ABC") film.

One embodiment of the invention is exemplified in FIG. 1 in which a three layer ("ABC") film is generally designated 10. Layer 11 of film 10 is a base layer ("A") selected from the group consisting of a polypropylene homopolymer, a polypropylene copolymer and combinations thereof. Layer 12 is a tie layer ("B") selected from the group consisting of a modified polyethylene homopolymer, a modified polyethylene copolymer, a modified polypropylene homopolymer, a modified polypropylene copolymer, an unmodified polyethylene copolymer and combinations thereof. Layer 13 is a heat sealant layer ("C") comprising a polyester or copolyester resin or blend thereof.

Figure 2:
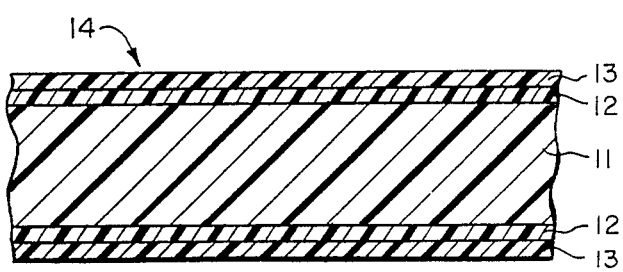
FIG. 2 illustrates a multilayer film of the present invention with heat sealant layers on both external sides, ("CBABC") film.

FIG. 2 illustrates an alternate embodiment in which a five layer ("CBABC") film is generally designated 14. In this embodiment, the base layer 11 ("A") is sandwiched by a pair of tie layers 12 ("B") and heat seal layers 13 ("C").

In both structures, the purpose of base layer 11 ("A") is to provide the primary body or strength of the film as well as the primary barrier to moisture penetration. In both films 10 and 14, the function of layer 12 is to tie or adhere layers 11 and 13. In both films 10 and 14, the function of layer 13 is to serve as a heat sealant layer when the film is sealed to itself or a second substrate.

Films 10 and 14 both have the ability to form "differential" seals. For example a package or bag utilizing films 10 or 14 can have very strong seals such as fusion seals on its seams by heat sealing at a temperature at the high end of the film's heat seal temperature range while a weaker, peelable seal can be made at a selected seam such as a "top" seam where the package or bag is to be opened by the end user. Such peelable seal can be made by heat sealing at a temperature at the low end of the film's heat seal temperature range.

Optionally, the heat sealant layer 13 may contain slip and antiblock agents to lower the coefficient of friction, C.O.F., of the film as well as to prevent roll blocking. Low C.O.F. (0.2-0.5g) is often necessary to enable the film to "slide through" various converting machinery.

The base layer ("A") comprises an extruded polypropylene polymer selected from the group consisting of a polypropylene homopolymer, polypropylene copolymer and combinations therof. This layer provides that majority of the barrier properties of the resultant film and comprises from about 30% to about 90% mil/mil of the total film thickness, preferably from about 60% to about 85% mil/mil.

The ("C") layer comprises from about 5% to about 33% mil/mil of the total film thickness, preferably from about 8% to about 20% mil/mil. The composition of the polymers in ("C") is a polyester or copolyester resin or blend thereof using compatible polymers.

The tie layer ("B") comprises polyolefin or preferably a modified polyolefin blend selected from the group consisting of a polyethylene homopolymer, a polyethylene copolymer, a polypropylene homopolymer, a polypropylene copolymer and combinations thereof preferably modified to promote adhesion between the base layer ("A") and heat sealant layer ("C"). The use of tie layers is well known in coextrusion to bond or "tie" together layers of different polymers which otherwise would not adhere. Preferably, a compound having a functional group is utilized to modify the polyethylene homopolymer, polyethylene copolymer, polypropylene homopolymer, polypropylene copolymer or combinations thereof to promote adhesion between the base layer ("A") and the heat sealant layer ("C"). Such compounds are usually polar compounds. Preferred polar compounds include carboxylic acids and carboxylic acid anhydrides. The tie layer comprises from about 5% to about 33% mil/mil of the total film thickness, preferably from about 8% to about 20% mil/mil. If more than one tie layer ("B") is utilized, for example, in a five layer ("C'B'AB"C'"') film, the first tie later ("B'") is a first modified polyolefin blend, a first modified polyethylene copolymer or combinations thereof, and the second tie layer, ("B''") is a second modified polyolefin blend, a second unmodified polyethylene copolymer or combinations thereof. The first tie layer may be the same as or of a different specific composition than the second tie layer provided that both are polyolefinic blends as described herein. The same applies if more than two tie layers ("B") are utilized in a multilayer film. Examples of commercial tie layers include the Plexar series from Norchem, Inc., CXA series from E. I. DuPont de Nemours and Company and the UF series from Mitsui. One type of tie layer is described in U.S. Pat. No. 4,477,532 assigned to Chemplex Company. This tie layer which is discussed in detail below is described as a modified polyolefin blend consisting essentially of about 0.1-40 parts by weight in said blend of a non-elastomeric graft copolymer of about 70-99.999 wt. % of a non-polar ethylene homopolymer or copolymer backbone having a density of at least 0.915 grafted with about 30-0.001 wt. % of at least one grafting monomer comprising at least one polymerizable ethylenically unsaturated carboxylic acid or carboxylic acid anhydride for a total of 100% and about 99.9-60 parts by weight of a substantially elastomer free blending resin mixture of about 25-75 wt. % of a linear low density polyethylene of a density of about 0.915 to less than 0.94, having a substantial absence of long-chain branching and a high degree of short-chain branching and about 75-25 wt. % of a non-elastomeric polypropylene for a total of 100%. The unsaturated carboxylic acids or acid anhydrides used as the grafting monomers include compounds such as acrylic acid, methacrylic acid, maleic anhydride, 4-methyl cyclohex-4-ene-1,2-dicarboxylic acid anhydride bicyclo (2,2,2)oct-5-ene-2,3-dicarboxylic acid anhydride, 2-cyclopentenyl acetic acid and abietic acid. 1,2,3,4,5,8,9,10-octahydronaphthalene-2,3-dicarboxylic acid anhydride, 2-oxa-1,3-diketospiro(4,4)-non-7-ene, bicyclo(2,2,1)hept-5-ene-2,3-dicarboxylic acid anhydride, x-methylbicyclo(2,2,1) hept-5-ene-2,3-dicarboxylic acid anhydride, maleopimaric acid, tetrahydrophthalic anhydride, x-methylnorborn-5-ene-2,3-dicarboxylic acid anhydride, norborn-5-ene-2,3-dicarboxylic acid anhydride, Nadic anhydride, methyl Nadic anhydride, Himic anhydride, methyl Himic anhydride and other fused ring monomers such as described in U.S. Pat. Nos. 3,873,643 and 3,882,194, both assigned to Chemplex Company. Cografting monomers such as described in U.S. Pat. No. 3,882,194 are also useful for preparing the graft copolymers. Included among the conjugated unsaturated esters suitable for cografting are dialkyl maleates, dialkyl fumarates, dialkyl itaconates, dialkyl mesaconates, dialkyl citraconates, alkylacrylates, alkyl crotonates, alkyl tiglates and alkyl methacrylates where alkyl represents aliphatic, aryl-aliphatic and cycloaliphatic groups containing 1-12 carbon atoms. Esters particularly useful in the cografted copolymers of this invention are dibutyl maleate, diethyl fumarate and dimethyl itaconate. Among the acids and acid anhydrides particularly useful in the cografted copolymers of this invention are maleic anhydride, tetrahydrophthalic anhydride, x-methylbicyclo(2,2,1-)hept-5-ene-2,3-dicarboxylic acid anhydride and bicyclo(2,2,1)hept-5-ene-2,3-dicarboxylic acid anhydride. It is often desirable to use more than one monomer in either or both classes of monomers in order to control the physical properties of the final products. The method in general consists of heating a mixture of the polymer or polymers and the monomer or monomers with or without a solvent. The mixture can be heated to above the melting point of the polyolefin with or without a catalyst. Thus, the grafting occurs in the presence of air, hydroperoxides, other free radical catalysts or in the essential absence of those materials where the mixture is maintained at elevated temperatures and (if no solvent is used) preferably under high shear. The graft and cograft copolymers of Chemplex Company are recovered by any method or system which separates or utilizes the graft copolymer that is produced. Thus, the term includes recovery of the copolymer in the form of precipitated fluff, pellets, powders and the like, as well as further chemically reacted or blended pellets, powders and the like or in the form of shaped articles formed directly from the resulting copolymer. Any of the commonly known hydroperoxides which have a half life of at least 1 minute at 145° C. may be used to produce the Chemplex Company's tie layer. Such hydroperoxides have the general formula R-0-OH, wherein R is an organic radical. Among the suitable hydroperoxides are t-butyl hydroperoxide, p-menthane hydroperoxide, pinane hydroperoxide, and cumene hydroperoxide, as well as others known in the art. The elevated temperature causes rapid decomposition of the hydroperoxide which catalyzes the reaction between the pololefin and monomer to form the graft copolymer. Obviously, the more homogeneous the mixture prior to heating, the less mixing will be required of the solution or molten composition. Generally, in order to obtain a desirable conversion, it has been found that some form of mixing is highly desirable in the absence of a solvent even when a uniform mixture of all of the components of the composition is formed prior to heating. In general, when a solvent is not used, the composition should be heated to a temperature above about 130° C. and it is preferred to use the temperatures ranging from about 200° -360° C. Temperatures substantially above about 360° C. are generally to be avoided in order to avoid substantial decomposition of the polymeric ingredients. However, if the decomposition products are not undesirable in the product, as in the production of high melt index waxes, higher temperatures may be employed. The reaction time required is quite short, being of the magnitude of from a few seconds to about twenty minutes, although extended heating times do not substantially affect the product and may be employed when desired for any reason. A convenient method of accomplishing the reaction is to premix the ingredients and then extrude the compositon through a heated extruder. Other mixing means, such as a Brabender mixer, a Banbury mixer, roll mills and the like may also be employed for the process. In order to prevent undue increase in molecular weight with a possiblity of some crosslinking at elevated temperatures, it is desirable to carry out the reaction in a closed vessel. A conventional single or multiple screw extruder accomplishes this result without the use of auxiliary equipment and for this reason is a particulary desirable reaction vessel.

Alternatively, unmodified polyethylenes can be used as the tie layer. Examples of unmodified polyethylenes which can be used are ethylene-vinyl acetate (EVA), ethylene methyl acrylate (EMA) or combinations thereof. EVA and EMA are polyethylene copolymers. Unmodified polyethylene copolymers other than EVA and EMA can be utilized. A combination of modified and unmodified polymers can be utilized.

The base layer 11 ("A") which comprises from about 30% to about 90% w/w of the total weight of the film, preferably from about 60% to about 85% w/w is the primary strength and moisture barrier layer. As disclosed earlier, the polymer used for this layer comprises polypropylene (PP) homopolymer, polypropylene (PP) copolymer or combinations thereof.

The heat sealant layer ("C") comprises from about 5% to about 40% w/w of the total weight of the film, preferably from about 10% to about 20% w/w of the total weight of the film.

The tie layer ("B") comprises from about 5% to about 35% w/w of the total weight of the film, preferably from about 7% to about 15% w/w of the total weight of the film.

Moisture barrier of films is commonly referred to as the Moisture Vapor Transmission Rate or MVTR. The MVTR is a laboratory measurement of the amount of moisture vapor which passes through a known area of film over a specified period of time. An example of the units of measurement is "grams per 100 square inches per 24 hours" (g/100 in$^2$/24 hrs.). Lower MVTR values correspond to better barrier films.

Table 1 illustrates the typical MVTR of 1.0 mil (0.001 in.) film made from polypropylene homopolymer.

TABLE 1

| 1.0 mil pp/film | 0.3 gm/100 in$^2$/24 hrs |
|---|---|

The acceptable MVTR range is from about 0.20 to about 1.0 g/100 in$^2$/24 hr. for the base layer ("A") and the preferred MVTR range of same is from about 0.20 to about 0.50 g/100 in$^2$/24 hr.

The polymers selected for the heat sealant layer 13 ("C") will determine the heat seal properties of the film. Utilizing a polyester heat sealant will yield the least expensive construction while utilizing a copolyester will increase the film's cost but broaden the heat seal range.

The polymer selected for the tie layer 12 ("B") can affect the functionality of the finished film. There are several commercial tie layers designed for adhering polypropylene to polyesters/copolyesters. Typically these tie layers are polyethylene or polypropylene polymers which have been chemically and/or mechanically modified to promote adhesion to the polyester/copolyester. This modification involves attaching functional groups to the polymer backbone. Alternatively, unmodified polyethylene copolymers can be utilized such as ethylene vinyl acetate (EVA), ethylene methyl acrylate (EMA) or combinations thereof. Combinations of such modified and unmodified polymers can also be utilized.

The effectiveness of tie layers is often determined by measuring the force to peel apart the bonded layers of film. The higher the peel strength, the better the bond. Table 2 contains data on the evaluation of several commercial tie layers and EMA (an unmodified polyethylene copolymer) in an PP/tie/copolyester film.

TABLE 2

| Peel Strength of Several Tie Layers 0.7 mil PP/0.2 mil tie/0.2 mil copolyester | |
|---|---|
| Tie layer | Peel Strength |
| Norchem Plexar 326 | 705 g/in |
| Du Pont CXA 2101 | 503 g/in |
| Mitsui UF 600 | 400 g/in |
| EMA | 304 g/in |

The invention and effect of polymer selection is illustrated by the following examples.

EXAMPLE 1

A base layer 11 ("A") consisting of a PP homopolymer with a density of 0.900 and melt flow index of 5 was coextruded with a heat sealant layer 13 ("C") consisting of a copolyester and a tie layer 12 ("B") consisting of a modified EVA, producing an "ABC" three layer film. One commercial PP polymer with these physical properties and used in this example is CD 4062 manufactured by Exxon Chemical Company. The copolyester used was made by reacting two glycols, ethylene glycol and diethylene glycol with terephthalic acid. This copolyester can be chemically defined as poly (ethylene-co-diethylene terephthalate) hereinafter referred to as diethylene glycol copolyester. One commercial copolyester of this formulation and used in this example is KODABOND 5116 manufactured by Eastman Chemical Products Inc. KODABOND is a registered trademark of Eastman Chemical Products, Inc. To reduce the coefficient of friction (COF) of the heat sealant layer when converted to film, a slip and antiblock master batch was added to the copolyester resin. The master batch comprised of 83 parts diethylene glycol copolyester, 7 parts silica and 10 parts silicone. This master batch was added to the copolyester to a final concentration of 8% w/w. The tie layer ("B") was a 18% EVA (polyethylene copolymer) chemically modified to promote adhesion to polyesters. This modification involved attaching functional groups onto the polyethylene backbone. One commercial tie layer having the ability for adhering polyester/copolyester resins to polypropylenes and utilized in this example is PLEXAR 326 manufactured by Norchem, Inc. PLEXAR is a registered trademark of Norchem, Inc. Norchem, Inc. is the successor corporation of Chemplex Company and PLEXAR is generally described in U.S. Pat. Nos. 4,477,532, 3,882,194 and 3,873,643. The base layer 11 ("A") resin was placed into a first extruder, the tie layer 12 ("B") resin was placed into a second extruder and the heat sealant layer 13 ("C") resin was placed into a third extruder. The resins were coextruded through an ("ABC") cast coextrusion feedblock and cast film die and then quenched on a chilled roll. The resultant film had a total thickness of 1.5 mil (0.0015 inches) of which 1.1 mil was the base layer 11 and the tie and heat sealant layers were each 0.2 mil thick.

EXAMPLE 2

The film of example 1 except the resultant film had a total thickness of 1.1 mil (0.0011 inches) of which 0.7 mil was base layer and the tie and heat sealant layers were each 0.2 mil thick.

EXAMPLE 3

The film of example 1 except that a polyester was used as the heat sealant layer 13 ("C").

EXAMPLE 4

The film of example 2 except that EMA was used as the tie layer 12 ("B").

EXAMPLE 5

To produce a moisture barrier heat sealable film commonly known to the art, an ("AB") two layer cast coextruded film was produced using the PP of example 1 as the base layer and ethylene vinyl acetate EVA (polyethylene copolymer) with 5% vinyl acetate (VA) content as the heat sealant layer. A tie layer was not required as PP and EVA will bond without a tie layer. This type of EVA is widely used as the heat sealant on many common packaging films.

Table 3 contains MVTR data on the films of examples 1 and 2 and shows that the film of example 1 has a better moisture barrier (lower MVTR). This better moisture barrier is due to the thicker PP layer.

TABLE 3

| Moisture Vapor Barrier Transmission Rate gm/100 in$^2$/24 hrs. | |
|---|---|
| Example 1 | 0.30 |
| Example 2 | 0.44 |

Table 4 compares the seal properties of the films of examples 1 and 3. The data demonstrates the effect of changing the heat sealant from a copolyester to a polyester. Table 4 shows that the film with the diethylene glycol copolyester heat sealant (example 1) has a much broader sealing latitude or range while the polyester heat sealant yields stronger seals. The film of example 1 will provide differential seal properties while the film of example 3 will not.

TABLE 4

| Seal Temperature (°F.) | Seal Peel Strength (gram/inch) | |
|---|---|---|
|  | Example 1 | Example 3 |
| 200 | 200 | 0 |
| 225 | 500 | 0 |
| 250 | 600 | 1350 |
| 300 | 675 | 1500 |
| 350 | 750 | 1500 |

Table 5 compares the layer adhesion of the films of examples 2 and 4. This data illustrates the superior layer adhesion of example 2 which utilizes a modified polyethylene (PLEXAR 326) tie layer compared to the use of the unmodified polyethylene tie layer (EMA) of example 4.

TABLE 5

| Layer Adhesion (peel strength) | |
|---|---|
| Example 2 | 705 gm/in |
| Example 4 | 304 gm/in |

Table 6 contains data on the heat sealing properties of the films of examples 1 and 5. This data illustrates the superior sealing properties of the copolyester heat sealant used in example 1 compared to that of the EVA heat sealant used in example 5. In particular, the copolyester sealant of example 1 provides a gradual increase in seal strength with temperature providing peelable seals (peelable defined as less than 800 grams/in) while the EVA sealant of Example 5 provided a peelable seal at only one temperature, 225° F., beyond which the seal stretched upon exerting the pulling force. This narrow seal range exhibited by the example 5 film is a disadvantage in packaging machinery operation.

TABLE 6

| Heat Sealing Temperature (°F.) | Heat Seal Strength (g/in) | |
|---|---|---|
|  | Example 1 | Example 5 |
| 200 | 200 | 0 |
| 225 | 500 | 400 |
| 250 | 600 | 1,600* |
| 300 | 675 | 1,600* |
| 350 | 750 | 1,600* |

*Seal stretched and did not peal.

Table 7 contains heat seal data on the films of examples 1 and 5 to various substrates. The superior sealability of the film of this invention (example 1) compared to film of the prior art (example 5) is shown.

TABLE 7

| Heat Seal Strength to Various Substrates (Sealed at 40 p.s.i. 0.5 sec. dwell, 350° F.) | | |
|---|---|---|
| Substrate | Example 1 | Example 5 |
| Paper | 300 g | 100 g/in |
| Oriented PET | 500 g | 0 g/in |
| PVC | 1000 g | 0 g/in |

Another advantage of the copolyester heat sealant film of example 1 is its ability to contain hot materials, such as microwave popcorn during cooking, without melting. EVA heat sealants, as used in example 5 soften and melt above 200° F., while the copolyester will crystallize under heat, yielding a high temperature surface stable above 500° F.

EXAMPLE 6

For producing a five layer ("CBABC") film, the three resins of example 1 are coextruded through a five layer ("CBABC") cast coextrusion feedblock. The film's total thickness is 1.9 mil comprising a core base layer ("A") of 1.1 mil and pairs of tie and heat sealant layers ("B") and ("C") with each layer being 0.2 mil. The resultant film is heat sealable on both sides having the ability to form both lap and fin seals.

Optionally, the films of examples 1-6 can be produced utilizing blown film coextrusion techniques. A spiral coextrusion blown film die and conventional cooling techniques for blown film such as an air ring and a tower can be utilized. A base layer resin is placed into a first extruder and a heat sealant layer resin is placed into a second extruder and a tie layer is placed into a third extruder. The resins are coextruded through a 3 layer ("ABC") or a 5 layer ("CBABC") spiral coextrusion die. Example 7 below describes the three layer film of example 1 produced utilizing a blown film coextrusion technique.

EXAMPLE 7

Using a three layer spiral coextrusion blown film die, the film of example 1 is produced. The base layer polymer is placed into a first extruder, the tie layer into a second and the heat sealant into a third extruder. The polymers are coextruded through a three layer ("ABC") spiral blown film coextrusion die. The base layer ("A") polymer is extruded into the outermost spiral channel, the tie layer ("B") polymer is extruded into the center (middle) channel and the heat sealant layer ("C") polymer is extruded into the innermost channel. The three layers are combined just prior to the final land of the die and then cooled by conventional blown film techniques.

EXAMPLE 8

Film of examples 1 and 2, OL MYLAR (a commercial OPET containing a heat seal coating) and PVDC coated OL MYLAR were separately used as the inside liner of a laminate bag.

Figure 3:
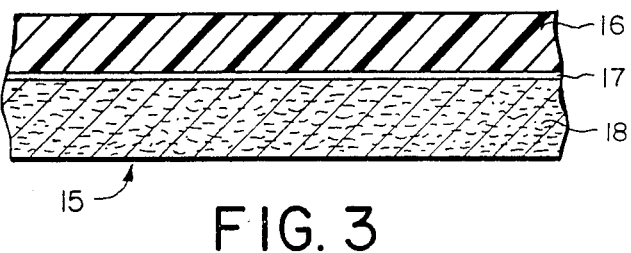
FIG. 3 illustrates adhesive laminations of films of the present invention to paper.

Referring to FIG. 3, the film 16 was laminated to paper 18 using a laminating adhesive 17. This laminate 15 was subsequently formed into bag 19 depicted in FIG. 3A.

FIG. 3A is a schematic of the general bag style made with this laminate. The bag 19 contained a longitudinal seam 20 which consisted of a film to film heat seal and paper to paper glued seal. The bag bottom 26 consisted of various folds, heat seals and glue seals.

This bag style is often referred to as a square bottom bag and can be produced on several commercial bag making machines.

FIG. 4 is a schematic of a different bag style sometimes referred to as "pinch bottom" style. This bag 27 contains longitudinal and end seams 28 and 29 made by the film to film heat seals and paper to paper or film to paper glue seals.

Square bottom bags and pinch bottom bags can be produced to a predetermined size.

Table 8 contains MVTR of the paper-film laminates of example 8. The poor moisture barrier properties of OL MYLAR is shown while the laminates utilizing the film of example 1 and the PVDC coated OL MYLAR have comparable MVTRs. The laminate of example 2 has a slightly higher MVTR as it is a thinner film.

TABLE 8

| Moisture Vapor Transmission Rates of Laminates (g/100 in$^2$/24 hrs.) | |
| --- | --- |
| Film | MVTR |
| OL MYLAR | 2.4 |
| PVDC coated OL MYLAR | 0.25 |
| Example 1 | 0.30 |
| Example 2 | 0.44 |

The heat seal properties of film-paper laminations is an extremely important property in most packaging applications. Table 9 contains data on the heat seal properties of the laminates of example 7. The films of this invention, examples 1 and 2, have comparable heat seal properties to the commonly used OL MYLAR product.

TABLE 9

| | Heat Seal Peel Strengths (grams/inch) | | |
| --- | --- | --- | --- |
| | Heat Seal Temperature | | |
| Film | 250° F. | 300° F. | 350° F. |
| OL MYLAR | 420 g/in | 700 g/in | 910 g/in |
| PVDC coated OL MYLAR | 420 | 700 | 910 |
| Example 1 | 400 | 700 | 900 |
| Example 2 | 400 | 700 | 900 |

In FIG. 3A, a predetermined amount of consumable food 23 is optionally disposed inside the laminate bag 19 and the open end of the bag 22 is heat sealed shut. When the consumable food 23 is cooked, the bag expands from steam pressure and physical expansion of the consumable food as shown in FIG. 3B. In some cases, this pressure and/or expansion causes the bag top seal 25 in FIG. 3B to peel open allowing the steam and pressure to escape. FIG. 3B illustrates the expanded bag 21 and cooked consumable food 24 which applies pressure on top seal 25. The seal 25 is a peelable seal made preferentially weaker than other bag seals to allow for pressure escape and/or ease of opening.

An example of a commercial packaging application where the bags of example 8 are used is in microwave popcorn bags. Example 9 describes an evaluation of the bags of example 8 in this application.

Conventional bag making techniques and equipment therefor is known in the art and is commercially available. Conventional bags include but are not limited to square bottom and pinch bottom bags. The following U.S. patents disclose various bag making techniques and equipment therefore: U.S. Pat. Nos. 3,277,798; 3,220,635; 3,143,277 and 2,265,075.

Conventional techniques for adhesively laminating film to paper, film to film and/or film to other materials is known in the art and adhesives such as glue or the like are commercially available. The following U.S. patents disclose various techniques for adhesively laminating film to paper, film to film and/or film to other materials and the adhesives used in such techniques: U.S. Pat. Nos. 4,515,840; 4,452,846; 4,421,580; 4,399,182; 4,389,438; 4,386,124; 4,264,662; 4,119,479; 4,105,118 and 3,922,440.

Adhesives for laminating film to paper include but are not limited to urethanes and acrylics. Adhesives for laminating film to paper are commercially available from Morton Chemical as well as other commercial sources. U.S. Pat. No. 3,343,663 discloses the use of polyethylene as an adhesive for laminating film to paper. Adhesives for laminating film to film include but are not limited to extrudable adhesives, resins and ties. Examples of adhesives for laminating film to film are Plexar and Binel (or CXA). Plexar is a modified polyolefin and a registered trademark of Norchem. Binel (or CXA) comprises copolymers of ethylene having one or more monomers wherein the monomer has a functional group. Binel (or CXA) is a registered trademark of E. I. DuPont de Nemours and Company.

EXAMPLE 9

Bags 19 of FIG. 3A, described in example 8, were filled with 74 grams of popping corn and 24 grams of shortening, 25. The tops of the bags were then heat sealed. The resultant package is a complete microwave popcorn product well known to the art. These bags, made with the 3 different films, were used for several aging studies. These studies measure the loss of pop volume due to a reduction of corn moisture content upon aging.

Two types of aging studies were performed: ambient conditions (75° F., 40% humidity) for 6 months and accelerated conditions (90° F., 35% humidity) for 3-4 weeks.

Figure 5:
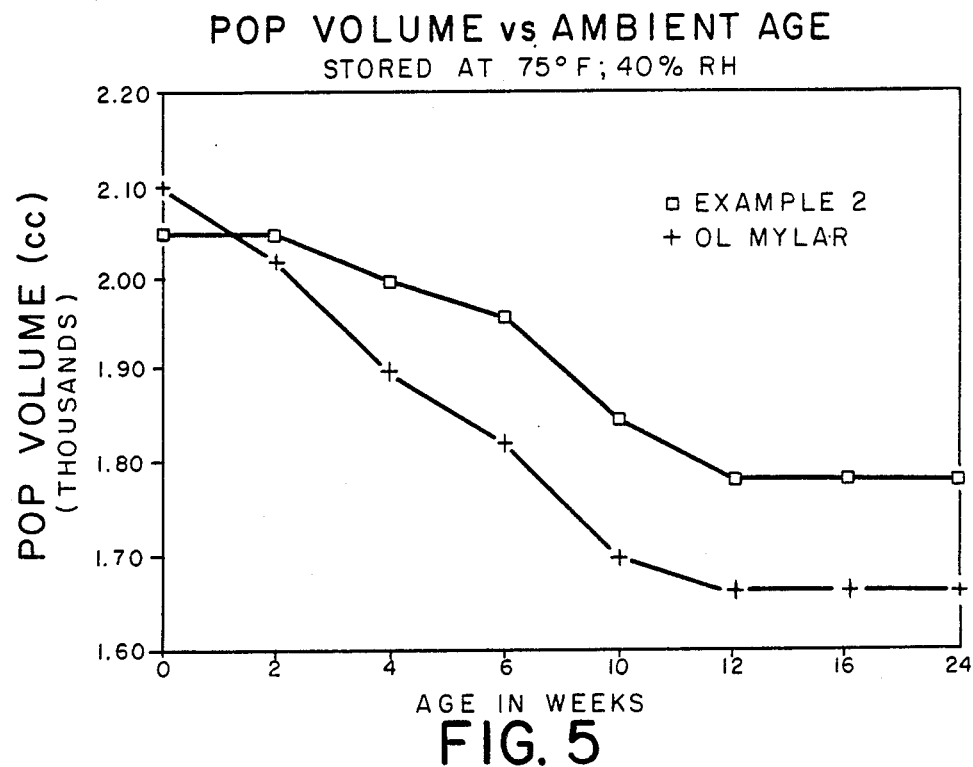
FIG. 5 graphically illustrates the effect of aging microwave popcorn bags at ambient aging conditions when the bags employ film of this invention and heat sealable OPET.
Figure 6:
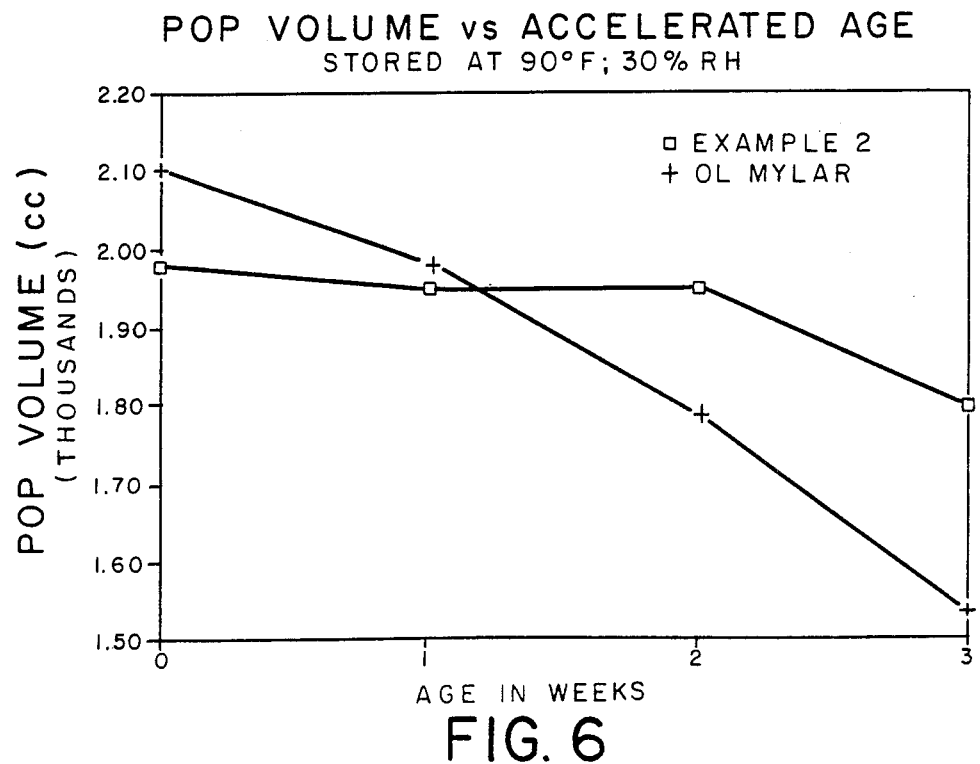
FIG. 6 graphically illustrates the effect of aging microwave popcorn bags at accelerated aging conditions when the bags employ film of this invention and heat sealable OPET.

FIGS. 5 and 6 illustrate the aging curves from ambient and accelerated studies (respectively) for bags of example 8 made with OL MYLAR and example 2 film. The curves were generated by popping 5 bags of each type at each weekly increment. The bags were popped in a 700 watt microwave over for 3¼minutes. The "pop volume" was measured by pouring the popped corn into a 4000cc graduated cylinder.

From FIGS. 5 and 6, it is noted that bags made with example 2 film reduce the pop volume loss exhibited by OL MYLAR bags. This effect is a result of the lower MVTR (better barrier) of the example 2 bags (table 8). The better barrier film retards the loss of corn moisture through the bag. This not only reduces the pop volume loss but helps preserve the popped corn texture. Note also from FIGS. 5 and 6 that approximately 3 weeks of accelerated aging is comparable to 6 months of ambient aging.

Figure 7:
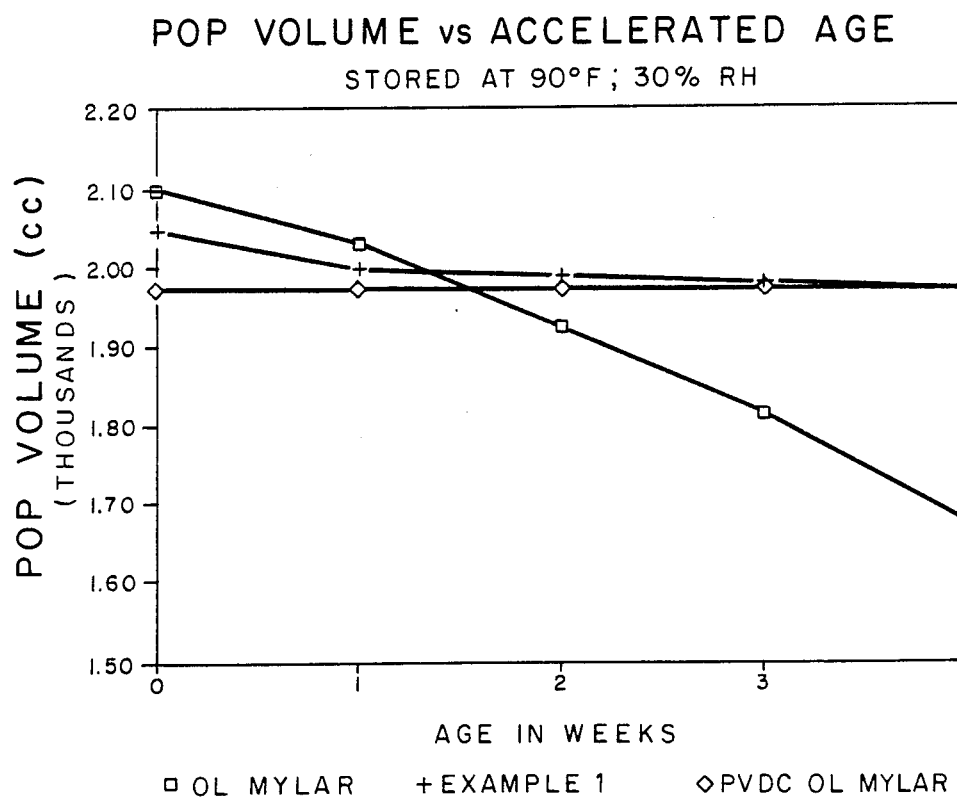
FIG. 7 graphically illustrates the effect of aging microwave popcorn bags at accelerated aging conditions when the bags employ film of this invention, heat sealable OPET and PVDC coated heat sealable OPET.

FIG. 7 contains accelerated aging curves for bags made from film of example 1, OL MYLAR and PVDC coated OL MYLAR. Comparing to FIG. 5, it is noted that the better moisture barrier of example 1 film compared to example 2 film further decreases the pop volume loss exhibited by bags made with OL MYLAR. Note also that bags made with example 1 film provide comparable protection from pop volume reduction due to aging as the PVDC coated OL MYLAR.

EXAMPLE 10

The comparative prior art film of example 5 was used to make laminate bags as described in example 8 and compared to bags made with a film of this invention (example 1 film). When used for microwave popcorn bags, the bags made with the film of example 5 showed excessive leakage (cooking oil) and did not have a peelable seal at the bag top making it difficult to open the bag and remove the cooked product (popcorn). The leakage with the bags made with example 5 film is a result of the EVA heat sealant and HDPE base layer melting. The film of example 1 did not melt as the copolyester sealant crystallized providing a high temperature barrier to melting.

In addition to their use in the microwave popcorn bag applications, films of this invention can be used for a wide variety of packaging applications. They can be used either alone or as a layer of a lamination or first substrate with a second substrate such as paper or other films. The film of the second substrate is not the same as the first substrate. Examples of some applications include snack food (potato chips, corn chips, or the like) packages, lidding stocks for frozen food trays, cooking pouches, medical pouches for supplies or devices, cheese wrap, processed meat packagings, bag-in-box liquid packaging or the like.

The present invention being thus described, it will be obvious that the same will be varied in many ways. Such variations are not intended as a departure from the spirit or scope of the invention and all such modications as would be obvious to one skilled in the art are intended to be included within the scope of the following claims.

I claim:

1. A nonoriented, heat sealable, coextruded, moisture barrier film comprising:
    a base layer selected from the group consisting of a polypropylene homopolymer, a polypropylene copolymer and combinations thereof;
    a heat sealant layer selected from the group consisting of a polyester, a copolyester and combinations thereof; and
    a tie layer between the base layer and the heat sealant layer selected from the group consisting of a modified polyolefin blend, an unmodified polyethylene copolymer and combinations thereof.

2. The nonoriented, heat sealable, coextruded moisture barrier film of claim 1 wherein the peel strength provided by the tie layer exceeds 600 g/in.

3. The nonoriented, heat sealable, coextruded, moisture barrier film of claim 1 wherein the nonoriented, heat sealable, coextruded moisture barrier film has a moisture vapor transmission rate of from about 0.20 to about 1.0 g/100 in$^2$/24 hr.

4. The nonoriented, heat sealable, coextruded, moisture barrier film of claim 3, wherein the nonoriented, heat sealable, coextruded, moisture barrier film has a moisture vapor transmission rate of from about 0.20 to 0.50 g/100 in$^2$/24 hr.

5. The nonoriented, heat sealable, coextruded, mositure barrier film of claim 3 wherein:
    the base layer comprises from about 30% to about 90% w/w of the total weight of the nonoriented, heat sealable, coextruded, moisture barrier film;
    the heat sealant layer comprises from about 5% to about 40% w/w of the total weight of the nonoriented, heat sealable, coextruded, moisture barrier film; and
    the tie layer comprises from about 5% to about 35% w/w of the total weight of the nonoriented heat sealable, coextruded, moisture barrier film.

6. The nonoriented, heat sealable, coextruded, mositure barrier film of claim 5 wherein:
    the base layer comprises from about 60% to about 85% w/w of the total weight of the nonoriented, heat sealable, coextruded, moisture barrier film;
    the heat sealant layer comprises from about 10% to about 20% w/w of the total weight of the nonoriented, heat sealable, coextruded, moisture barrier film; and
    the tie layer comprises from about 7% to about 15% w/w of the total weight of the nonoriented heat sealable, coextruded, moisture barrier film.

7. The nonoriented, heat sealable, coextruded, moisture barrier film of claim 3 wherein:
    the base layer comprises from about 30% to about 90% mil/mil of the total thickness of the nonoriented, heat sealable, coextruded, moisture barrier film;
    the heat sealant layer comprises from about 5% to about 33% mil/mil of the total thickness of the nonoriented, heat sealable, coextruded, moisture barrier film; and
    the tie layer comprises from about 5% to about 33% mil/mil of the total thickness of the nonoriented, heat sealable, coextruded, moisture barrier film.

8. The nonoriented, heat sealable, coextruded, mositure barrier film of claim 7 wherein:
    the base layer comprises from about 60% to about 80% mil/mil of the total thickness of the nonoriented, heat sealable, coextruded, moisture barrier film;
    the heat sealant layer comprises from about 8% to about 20% mil/mil of the total thickness of the nonoriented, heat sealable, coextruded, moisture barrier film; and
    the tie layer comprises from about 8% to about 20% mil/mil of the total thickness of the nonoriented, heat sealable, coextruded, moisture barrier film.

9. The nonoriented, heat sealable, coextruded, moisture barrier film of claim 3 wherein:
    the polyolefin of the modified polyolefin blend is selected from the group consisting of a polyethylene homopolymer, a polyethylene copolymer, a polypropylene homopolymer, a polypropylene copolymer and combinations thereof;

the polyolefin blend is modified to promote adhesion between the base layer and the heat sealant layer; and the unmodified polyethylene copolymer is selected from the group consisting of ethylene methyl acrylate, ethylene vinyl acetate and combinations thereof.

10. The nonoriented, heat sealable, coextruded, moisture barrier film of claim 3 wherein:

the copolyester of the heat sealant layer comprises diethylene glycol copolyester; and diethylene glycol copolyester is chemically defined as poly (ethylene-codiethylene terephthalate).

11. The nonoriented, heat sealable, coextruded, moisture barrier film of claim 3 coextruded by a cast coextrusion technique.

12. The nonoriented, heat sealable, coextruded, moisture barrier film of claim 3 coextruded by a blown film coextrusion technique.

13. The nonoriented heat sealable, coextruded, moisture barrier film of claim 3 wherein the heat sealant layer contains a slip agent and an antiblock agent.

14. The nonoriented, heat sealable, coextruded, moisture barrier film of claim 13 wherein:

the slip agent is an organic silicone; and the antiblock is an inorganic diatomaceous earth.

15. The nonoriented, heat sealable, coextruded, moisture barrier film of claim 3 wherein the heat sealant layer is differentially sealable utilizing a fusion seal for a strong seal and a peelable seal for a weaker seal.

16. A nonoriented, heat sealable, coextruded, moisture barrier film comprising:

a first tie layer selected from the group consisting of a first modified polyolefin blend, a first unmodified polyethylene copolymer and combinations thereof;

a second tie layer selected from the group consisting of a second modified polyolefin blend, a second unmodified polyethylene copolymer and combinations thereof;

a base layer selected from the group consisting of a polypropylene homopolymer, a polypropylene copolymer and combinations thereof between the first tie layer and the second tie layer;

a first heat sealant layer selected from the group consisting of a polyester, a copolyester and combinations thereof; and a second heat sealant layer selected from the group consisting of a polyester, a copolyester and combinations thereof wherein:

the first tie layer, the second tie layer and the base layer are between the first heat sealant layer and the second heat sealant layer; and the first heat sealant layer and the second heat sealant layer are outer layers.

17. The nonoriented, heat sealable, coextruded moisture barrier film of claim 16 wherein the peel strength provided by the tie layer exceeds 600 g/in.

18. The nonoriented, heat sealable, coextruded, moisture barrier film of claim 16 wherein the nonoriented, heat sealable, coextruded moisture barrier film has a moisture vapor transmission rate of from about 0.20 to about 1.0 g/100 in$^2$/24 hr.

19. The nonoriented, heat sealable, coextruded, moisture barrier film of claim 18, wherein the nonoriented, heat sealable, coextruded, moisture barrier film has a moisture vapor transmission rate of from about 0.20 to 0.50 g/100$^2$/24 hr.

20. The nonoriented, heat sealable, coextruded, moisture barrier film of claim 18 wherein:

the base layer comprises from about 30% to about 90% w/w of the total weight of the nonoriented, heat sealable, coextruded, moisture barrier film;

the first heat sealant layer and the second heat sealant layer combined comprise from about 5% to about 40% w/w of the total weight of the nonoriented, heat sealable, coextruded, moisture barrier film; and the first tie layer and the second tie layer combined comprise from about 5% to about 35% w/w of the total weight of the nonoriented heat sealable, coextruded, moisture barrier film.

21. The nonoriented, heat sealable, coextruded, moisture barrier film of claim 20 wherein:

the base layer comprises from about 60% to about 85% w/w of the total weight of the nonoriented, heat sealable, coextruded, moisture barrier film;

the first heat sealant layer and the second heat sealant layer combined comprise from about 10% to about 20% w/w of the total weight of the nonoriented, heat sealable, coextruded, moisture barrier film; and the first tie layer and the second tie layer combined comprise from about 7% to about 15% w/w of the total weight of the nonoriented heat sealable, coextruded, moisture barrier film.

22. The nonoriented, heat sealable, coextruded, moisture barrier film of claim 18 wherein:

the base layer comprises from about 30% to about 90% mil/mil of the total thickness of the nonoriented, heat sealable, coextruded, moisture barrier film;

the first heat sealant layer and the second heat sealant layer combined comprise from about 5% to about 33% mil/mil of the total thickness of the nonoriented, heat sealable, coextruded, moisture barrier film; and the first tie layer and the second tie layer combined comprise from about 5% to about 33% mil/mil of the total thickness of the nonoriented, heat sealable, coextruded, moisture barrier film.

23. The nonoriented, heat sealable, coextruded, moisture barrier film of claim 22 wherein:

the base layer comprises from about 60% to about 80% mil/mil of the total thickness of the nonoriented, heat sealable, coextruded, moisture barrier film;

the first heat sealant layer and the second heat sealant layer combined comprise from about 8% to about 20% mil/mil of the total thickness of the nonoriented, heat sealable, coextruded, moisture barrier film; and the first tie layer and the second tie layer combined comprise from about 8% to about 20% mil/mil of the total thickness of the nonoriented, heat sealable, coextruded, moisture barrier film.

24. The nonoriented, heat sealable, coextruded, moisture barrier film of claim 18 wherein:

the polyolefin of the first modified polyolefin blend is selected from the group consisting of a polyethylene homopolymer, a polyethylene copolymer, a polypropylene homopolymer, a polypropylene copolymer and combinations thereof;

the first modified polyolefin blend is modified to promote adhesion between the base layer and the first heat sealant layer;

the first unmodified polyethylene copolymer is selected from the group consisting of ethylene methyl acrylate, ethylene vinyl acetate and combinations thereof;

the polyolefin of the second modified polyolefin blend is selected from the group consisting of a polyethylene homopolymer, a polyethylene copolymer, a polypropylene homopolymer, a polypropylene copolymer and combinations thereof;

the second modified polyolefin blend is modified to promote adhesion between the base layer and the second heat sealant layer; and the second unmodified polyethylene copolymer is selected from the group consisting of ethylene methyl acrylate, ethylene vinyl acetate and combinations thereof.

25. The nonoriented, heat sealant, coextruded, moisture barrier film of claim 18 wherein:

the copolyester of the heat sealant layer comprises diethylene glycol copolyester; and diethylene glycol copolyester is chemically defined as poly (ethylene-co-diethylene terephthalate).

26. The nonoriented heat sealable, coextruded, moisture barrier film of claim 18 coextruded by a cast coextrusion technique.

27. The nonoriented, heat sealable, coextruded, moisture barrier film of claim 18 coextruded by a blown film coextrusion technique.

28. The nonoriented heat sealable, coextruded, moisture barrier film of claim 18 wherein the heat sealant layer contains a slip agent and an antiblock agent.

29. The nonoriented, heat sealable, coextruded, moisture barrier film of claim 28 wherein:

the slip agent is an organic silicone; and the antiblock is an organic diatomaceous earth.

30. The nonoriented, heat sealable, coextruded, moisture barrier film of claim 18 wherein the heat sealant layer is differentially sealable utilizing a fusion seal for a strong seal and a peelable seal for a weaker.

31. The nonoriented, heat sealable, coextruded, moisture barrier film of claim 30 wherein the film is heat sealable on both sides of the film.

32. The nonoriented, heat sealable, coextruded, moisture barrier film of claim 31 having the ability to form a lap seal.

33. A laminate sheet comprising:

a first substrate comprising a nonoriented, heat sealable, coextruded, moisture barrier film comprising:

a base layer selected from the group consisting of a polypropylene homopolymer, a polypropylene copolymer and combinations thereof;

a heat sealant layer selected from the group consisting of a polyester, a copolyester and combinations thereof; and a tie layer between the base layer and the heat sealant layer wherein the tie layer is selected from the group consisting of a modified polyethylene homopolymer, a modified polyethylene copolymer, a modified polypropylene homopolymer, a modified polypropylene copolymer, an unmodified polyethylene copolymer and combinations thereof; and a second substrate adhesively laminated to the first substrate.

34. The laminate sheet of claim 33 wherein the nonoriented heat sealable, coextruded, moisture barrier film comprises:

a first tie layer selected from the group consisting of a modified polyethylene homopolymer, a modified polyethylene copolymer, a modified polypropylene homopolymer, a modified polypropylene copolymer, an unmodified polyethylene copolymer and combinations thereof;

a second tie layer selected from the group consisting of a modified polyethylene homopolymer, a modified polyethylene copolymer, a modified polypropylene homopolymer, a modified polypropylene copolymer, an unmodified polyethylene copolymer and combinations thereof;

a base layer selected from the group consisting of a polypropylene homopolymer, a polypropylene copolymer and combinations thereof between the first tie layer and the second tie layer;

a first heat sealant layer selected from the group consisting of a polyester, a copolyester and combinations thereof; and a second heat sealant layer selected from the group consisting of a polyester, a copolyester and combinations thereof wherein:

the first tie layer, the second tie layer and the base layer are between the first heat sealant layer and the second heat sealant layer; and the first heat sealant layer and the second heat sealant layer are outer layers.

35. The laminate sheet of claim 33 wherein:

the second substrate is selected from the group consisting of a paper and a film; and the film of the second substrate is not the same as the first substrate.

36. The laminate sheet of claim 34 wherein:

the second substrate is selected from the group consisting of a paper and a film; and the film of the second substrate is not the same as the first substrate.

37. The laminate sheet of claim 33 wherein the nonoriented, seat sealable, coextruded, moisture barrier film has a single heat sealant layer.

38. A laminate bag comprising:

a nonoriented, heat sealable, coextruded, moisture barrier film comprising:

a base layer selected from the group consisting of a polypropylene homopolymer, a polypropylene copolymer and combinations thereof;

a heat sealant layer selected from the group consisting of a polyester, a copolyester and combinations thereof; and a tie layer between the base layer and the heat sealant layer wherein the tie layer is selected from the group consisting of a modified polyethylene homopolymer, modified polyethylene copolymer, a modified polypropylene homopolymer, a modified polypropylene copolymer, an unmodified polyethylene copolymer and combinations thereof;

a paper lamina having the nonoriented, heat sealable, coextruded, moisture barrier film adhesively laminated to the paper lamina to form a laminate sheet wherein the laminate sheet is formed into the laminate bag having a predetermined size.

39. The laminate bag of claim 38 wherein the nonoriented, heat sealable, coextruded, moisture barrier film comprises:

a first tie layer selected from the group consisting of a modified polyethylene homopolymer, a modified polyethylene copolymer, a modified polypropylene homopolymer, a modified polypropylene copolymer, an unmodified polyethylene copolymer and combinations thereof;

a second tie layer selected from the group consisting of a modified polyethylene homopolymer, a modified polyethylene copolymer, a modified polypropylene homopolymer, a modified polypropylene copolymer, an unmodified polyethylene copolymer and combinations thereof;

a base layer selected from the group consisting of a polypropylene homopolymer, a polypropylene copolymer and combinations thereof between the first tie layer and the second tie layer;

a first heat sealant layer selected from the group consisting of a polyester, a copolyester and combinations thereof; and a second heat sealant layer selected from the group consisting of a polyester, a copolyester and combinations thereof wherein:

the first tie layer, the second tie layer and the base layer are between the first heat sealant layer and the second heat sealant layer; and the first heat sealant layer and the second heat sealant layers are outer layer.

40. The laminate bag of claim 38 wherein the nonoriented, heat sealable, coextruded, moisture barrier film has a single heat sealant layer.

* * * * *

UNITED STATES PATENT AND TRADEMARK OFFICE
CERTIFICATE OF CORRECTION

PATENT NO. : 4,716,061
DATED : Dec. 29, 1987
INVENTOR(S) : John P. Winter

It is certified that error appears in the above-identified patent and that said Letters Patent is hereby corrected as shown below:

IN THE BACKGROUND AND
SUMMARY OF THE INVENTION

In column 1, line 57, please delete "double bubble" and substitute therefor --double-bubble--;

In column 2, line 19, please delete "well known" and substitute therefor --well-known--;

In column 3, line 27, please delete "polyethlenes" and substitute therefor --polyethylenes--;

In column 3, lines 62-63, please delete "heretofor" and substitute therefor --heretofore--;

In column 4, line 41, please delete "therefore" and substitute therefor --therefor--.

IN THE DETAILED DESCRIPTION
OF THE PREFERRED EMBODIMENTS

In column 6, line 49, please delete "provides that" and substitute therefor --provides the--;

In column 7, line 12, please delete "tie later" and substitute therefor --tie layer--;

UNITED STATES PATENT AND TRADEMARK OFFICE
CERTIFICATE OF CORRECTION

PATENT NO. : 4,716,061
DATED : Dec. 29, 1987
INVENTOR(S) : John P. Winter

It is certified that error appears in the above-identified patent and that said Letters Patent is hereby corrected as shown below:

In column 8, line 39, please delete "pololefin" and substitute therefor --polyolefin--;

In column 9, line 17, please delete "homopolyer" and substitute therefor --homopolymer--;

In column 10, line 2, please delete "in an" and substitute therefor --in a--;

In column 10, line 40, please delete "was a" and substitute therefor --was an--;

In column 11, line 10, under the heading "EXAMPLE 5" please insert the sub-heading --(Comparative Prior Art)--;

In column 12, line 16, please delete "peal" and substitute therefor --peel--;

In column 12, line 34, please insert a comma (,) after "example 5";

In column 13, line 17, please insert the word --view-- after "schematic";

In column 13, line 25, please insert the word --view-- after "schematic";

UNITED STATES PATENT AND TRADEMARK OFFICE
CERTIFICATE OF CORRECTION

PATENT NO. : 4,716,061

DATED : Dec. 29, 1987

INVENTOR(S) : John P. Winter

It is certified that error appears in the above-identified patent and that said Letters Patent is hereby corrected as shown below:

In column 13, line 50, please delete "example 7" and substitute therefor --example 8--;

In column 14, line 19, please delete "therefore" and substitute therefor --therefor--;

In column 14, line 52, please delete the comma (,) after "shortening";

In column 14, line 68, please delete "over" and substitute therefor --oven--;

In column 15, line 52, please delete "modications" and substitute therefor --modifications--.

IN THE CLAIMS:

In Claim 2 (column 16, line 1), please insert a comma (,) after "coextruded";

In Claim 3 (column 16, line 6), please insert a comma (,) after "coextruded";

In Claim 5 (column 16, lines 14-15), please delete "mositure" and substitute therefor --moisture--;

UNITED STATES PATENT AND TRADEMARK OFFICE
CERTIFICATE OF CORRECTION

PATENT NO. : 4,716,061

DATED : Dec. 29, 1987

INVENTOR(S) : John P. Winter

It is certified that error appears in the above-identified patent and that said Letters Patent is hereby corrected as shown below:

In Claim 5 (column 16, line 24), please insert a comma (,) after "nonoriented";

In Claim 6 (column 16, line 36), please insert a comma (,) after "nonoriented";

In Claim 8 (column 16, lines 51-52), please delete "mositure" and substitute therefor --moisture--;

In Claim 10 (column 17, line 15), please delete "codiethylene" and substitute therefor --co-diethylene--;

In Claim 13 (column 17, line 22), please insert a comma (,) after "nonoriented";

In Claim 17 (column 17, line 58), please insert a comma (,) after "coextruded";

In Claim 18 (column 17, line 63), please insert a comma (,) after "coextruded";

In Claim 20 (column 18, line 15), please insert a comma (,) after "nonoriented";

In Claim 21 (column 18, line 29), please insert a comma (,) after "nonoriented";

In Claim 26 (column 19, line 26), please insert a comma (,) after "nonoriented";

UNITED STATES PATENT AND TRADEMARK OFFICE
CERTIFICATE OF CORRECTION

PATENT NO. : 4,716,061

DATED : Dec. 29, 1987

INVENTOR(S) : John P. Winter

It is certified that error appears in the above-identified patent and that said Letters Patent is hereby corrected as shown below:

In Claim 28 (column 19, line 32), please insert a comma (,) after "nonoriented";

In Claim 30 (column 19, line 43), please insert the word --seal-- after "weaker";

In Claim 34 (column 20, lines 1-2, please insert a comma (,) after "nonoriented";

In Claim 37 (column 20, line 42), please delete "seat" and substitute therefor --heat--;

In Claim 39 (column 22, line 13), please delete "layers are outer layer" and substitute therefor --layer are outer layers--.

Signed and Sealed this

Seventh Day of February, 1989

Attest:

DONALD J. QUIGG

*Attesting Officer*     *Commissioner of Patents and Trademarks*